United States Patent Office 2,821,538
Patented Jan. 28, 1958

2,821,538

NOVEL CARBONIC ACID DIESTERS OF AN ALIPHATIC ALCOHOL AND A POLYGLYCOL MONOETHER

Kenneth L. Dille, Robert Y. Heisler, and Stanley R. Newman, Fishkill, and Norman Alpert, Poughkeepsie, N. Y., assignors to The Texas Company, New York, N. Y., a corporation of Delaware No Drawing. Application January 18, 1956
Serial No. 559,762

3 Claims. (Cl. 260—463)

This invention relates to novel polyglycol derivatives which have a wide variety of uses. More particularly this invention discloses a novel class of compounds generically called mixed carbonic acid diesters of an aliphatic alcohol and a polyglycol monoether.

The novel compounds of this invention have the following general formula:

$$R(OR')_nOCOOR''$$

wherein R is a monovalent hydrocarbon radical containing 6 to 18 carbon atoms, R' is a divalent aliphatic hydrocarbon radical containing 2 to 3 carbon atoms, R" is an aliphatic hydrocarbon radical containing 1 to 14 carbon atoms, and $n$ has a value of 3 to 15. These mixed carbonic acid diesters of an aliphatic alcohol and a polyglycol monoether, hereafter called "mixed carbonic acid diesters," are particularly useful as fuel and lubricant oil additives as disclosed in our copending applications, Serial Nos. 559,761 and 559,763, filed of even date.

The "mixed carbonic acid diesters" are readily formed by a series of reactions involving the formation of a chloroformate by reaction of phosgene with a polyglycol monoether and subsequent reaction of the resulting chloroformate with an aliphatic alcohol containing 1 to 14 carbon atoms in the presence of a hydrogen chloride acceptor, such as pyridine or quinoline. An alternate reaction procedure involves formation of an alkyl chloroformate by reaction of an alcohol with phosgene and subsequent reaction of the alcohol chloroformate with a polyglycol monoether in the presence of a hydrogen chloride acceptor. The detailed preparation of the polyglycol monoether monoalkyl carbonates of this invention will be described hereafter in connection with the preparation of the individual compounds.

The novel polyglycol monoether monoalkyl carbonates of this invention are exemplified by the following: the carbonic acid diester of amyl alcohol and of pentaethylene glycol monodecylpheyl ether, the carbonic acid diester of ethyl alcohol and of pentapropylene glycol monooctylphenyl ether, the carbonic acid diester of lauryl alcohol and of pentaethylene glycol monoamylphenyl ether, the carbonic acid diester of methyl alcohol and of decaethylene glycol monolauryl ether, the carbonic acid diester of amyl alcohol and of octaethylene glycol monooctyl ether, the carbonic acid diester of octyl alcohol and of decapropylene glycol monolauryl ether, the carbonic acid diester of 2-ethylhexyl alcohol and of pentapropylene glycol monooctyl ether, the carbonic acid diester of myristyl alcohol and of pentaethylene glycol monoheptyl ether, and the carbonic acid diester of nonyl alcohol and of hexaethylene glycol monolauryl ether.

The following examples illustrate the preparation of the polyglycol monoether monoalkyl carbonates of this invention.

Example 1

Into a 5 liter, three-necked flask, equipped with a stirrer, condenser, addition funnel and thermowell, 1810 grams (4.25 moles) of pentaethylene glycol monooctylphenyl ether and 336 grams (4.25 moles) of pyridine were introduced. The mixture was maintained below 50° F. and 512 grams (4.25 moles) of allyl chloroformate was slowly added. After stirring overnight, the mixture was washed with 500 ml. of water to remove pyridine hydrochloride. The product was subsequently treated with two 10% hydrochloric acid washes of 1 liter each until the mixture was distinctly acid and then was washed with saturated sodium chloride solution until the washings were nearly neutral, which took 3 washes of 700 ml. apiece. The product was dried over sodium sulfate which was subsequently removed by filtration. To the dried oil there was added benzene washings of the flask and drying agent. The benzene-containing product was distilled at 2 mm. After an overhead weighing 18 grams, distilling at 50 to 60° C., having an $RI_D{}^{20}$ of 1.4390, was obtained, the pot was maintained at 400° F. for another half hour. This residue weighing 1825 grams and having an $RI_D{}^{20}$ of 1.4926 was the carbonic acid diester of allyl alcohol and pentaethylene glycol monooctylphenyl ether. The product was subjected to quantitative analysis with the following results:

|            | Found | Calculated |
|------------|-------|------------|
| C, percent | 66.53 | 66.0       |
| H, percent | 9.77  | 9.0        |
| Mol wt     | 462   | 510        |

Example 2

Into a 5 liter flask 2400 grams (4 moles) of polyethylene glycol monolauryl ether (av. mol wt. 600) and 379 grams (4.8 moles) of pyridine were introduced. After the reaction mixture was cooled below 50° F., 482 grams (4.0 moles) of allyl chloroformate was added with stirring at a rate such that the temperature was maintained below 50° F. 500 ml. of ether was added to aid in the stirring of the product. After stirring overnight, the reaction product was subjected to washing and drying procedures identical with those described in Example 1. The ether was removed by distillation and the residue was stirpped at a pot temperature of 400° F. and a pressure of 500 microns. The residue weighing 2520 grams and having an $RI_D{}^{20}$ of 1.4461, as contrasted with the $RI_D{}^{20}$ of 1.4448 of the polyglycol monoether charge material, was subjected to quantitative analysis with the following results:

C, percent _____ 61.47
H, percent _____ 10.16
Chlorine, percent _____ less than 0.1
Spec. grav. at 25° C. _____ 1.040

An infrared curve of the reaction product showed substantially no hydroxyl adsorption, but did show the typical carbonate absorption.

The foregoing analysis indicates that the reaction product was a carbonic acid diester of allyl alcohol and polyethylene glycol monolauryl ether (av. mol wt. 600).

Obviously, many modifications and variations of the invention, as hereinbefore set forth, may be made without departing from the spirit and scope thereof, and therefore, only such limitations should be imposed as are indicated in the appended claims.

We claim:
1. Carbonic acid diesters of an aliphatic alcohol and a polyglycol monoether having the following general formula

$$R(OR')_nOCOOR''$$

wherein R is selected from the group consisting of alkyl and alkaryl radicals containing 6 to 18 carbon atoms, R' is a divalent saturated aliphatic hydrocarbon radical containing 2 to 3 carbon atoms, R" is an aliphatic hydrocarbon radical containing 1 to 14 carbon atoms, and $n$ has a value of 3 to 15.

2. Carbonic acid diester of allyl alcohol and of polyethylene glycol monolauryl ether (av. mol wt. 600).

3. Carbonic acid diester of allyl alcohol and of pentaethylene glycol monooctylphenyl ether.

References Cited in the file of this patent

UNITED STATES PATENTS

| | | |
|---|---|---|
| 2,379,252 | Muskat et al. | June 26, 1945 |
| 2,381,511 | Muskat et al. | Aug. 7, 1945 |
| 2,626,264 | Brod et al. | Jan. 20, 1953 |
| 2,651,657 | Mikeska et al. | Sept. 8, 1953 |
| 2,718,504 | Bartlett | Sept. 20, 1955 |